US005206004A

United States Patent [19]

Park

[11] Patent Number: 5,206,004

[45] Date of Patent: Apr. 27, 1993

[54] SILANE COMPOSITIONS AND PROCESS

[75] Inventor: Won S. Park, Baton Rouge, La.

[73] Assignee: Ethyl Corportion, Richmond, Va.

[21] Appl. No.: 723,785

[22] Filed: Jul. 1, 1991

Related U.S. Application Data

[63] Continuation of Ser. No. 516,315, Apr. 30, 1990.

[51] Int. Cl.[5] .............................................. C01B 33/34

[52] U.S. Cl. .................................... 423/700; 423/210; 423/347; 423/349; 502/60; 502/85; 55/67; 55/68; 55/75

[58] Field of Search ............... 423/328, 329, 330, 118, 423/347, 349, 210, 700; 502/85, 60; 55/75, 67, 68; 252/135, 174.25

[56] References Cited

U.S. PATENT DOCUMENTS

| | | | |
|---|---|---|---|
| 2,882,243 | 4/1959 | Milton | 252/455 |
| 4,537,759 | 8/1985 | Walker et al. | 423/349 |
| 4,554,141 | 11/1985 | Scull et al. | 423/245 |
| 4,933,162 | 6/1990 | Vansant et al. | 423/488 |

*Primary Examiner*—R. Bruce Breneman
*Attorney, Agent, or Firm*—Steven R. Eck; Richard J. Hammond

[57] ABSTRACT

Improved molecular sieves and processes for treatment of molecular sieves which permit use for separation of ethylene and silane without attending formation of ethylsilane. Such treatment includes treatment of sieves with silane at an effective temperature, pressure and time.

4 Claims, No Drawings

SILANE COMPOSITIONS AND PROCESS

This application is a continuation of application Ser. No. 516,315, filed Apr. 30, 1990.

This invention relates to silane compositions and methods of purification to remove contaminants without adverse effects. More particularly, the present invention relates to an improved method of using molecular sieves to separate ethylene and silane in composition without forming ethylsilane as a further contamination of the silane.

BACKGROUND

Various methods exist for production of electronic grade silicon and its precursors. These methods include processes for the purification of silane before its reaction (e.g. thermal decomposition) to electronic grade silicon. For examples, see Walker et al., (U.S. Pat. No. 4,537,759), incorporated in its entirety herein, and the references therein.

Particular examples of contaminants of concern are ethylene and ethylsilane, which can be produced in the reactions to form silane. Distillation can be used to remove ethylsilane, leaving ethylene as a contaminant in the relatively purified silane composition. However, distillation of ethylene from silane can be difficult due in part to the compounds' close molecular weights and boiling points.

An alternative to distillation of ethylene from silane can be the use of molecular sieves. Although such sieves can be used effectively to separate ethylene from silane, such molecular sieve purification process itself can result in the production of ethylsilane and attending recontamination of silane with ethylsilane. There remains a need for further improvements in the separation of ethylene and silane with molecular sieves without an attending production of ethylsilane.

SUMMARY

Improved molecular sieves and processes for treatment of molecular sieves have now been discovered which allow for the separation of ethylene and silane using molecular sieves without the formation of significant amounts of ethylsilane. These processes include treatment of the molecular sieves both for initial and regenerative uses. The invention also includes processes for removing ethylene in admixture with silane.

DESCRIPTION OF THE PREFERRED EMBODIMENTS

In one embodiment the present invention is a process for treating a molecular sieve, which molecular sieve comprises sodium zeolite means for separating ethylene and silane in admixture, the process comprising treating the molecular sieve with silane for a time and at a temperature effective to prevent the formation of a significant amount (e.g. more than 5 weight percent) of ethylsilane when separating the ethylene and the silane using the sieve.

The molecular sieve to be treated in accordance with the invention comprises sodium zeolite means suitable for the separation of ethylene from silane in admixture. Preferably, the zeolite is a sodium aluminum silicate zeolite, more preferably a sodium aluminum silicate type 4-A zeolite. This zeolite typically can have a pore diameter average size of preferably about 4.1 nanometers and a pore volume of preferably about 47%.

Treating the molecular sieve can be a pretreatment of the sieve before the initial, virgin use of the sieve or can be the treatment of a sieve after a previous use of the sieve with or without a pretreatment of the sieve in accordance with the present invention. Treatment of the sieve can be done as a portion of a regeneration process of the sieve, preferable as the final step before use of the sieve for the separation of ethylene from silane in admixture.

Treatment of the molecular sieve is performed with silane, preferably in the gaseous state. Preferably reagent grade silane (e.g. about 99% pure) can be used, more preferably purer silane such as silane decomposable to electronic grade silicon.

The conditions of pressure for the treatment can be held constant or can be varied. Pressures useable can range from sub-atmospheric to atmospheric (e.g. ambient) to super-atmospheric (e.g. one to ten atmospheres) pressures. The higher pressures are preferred, but can be limited due to concerns of molecular sieve structural damages and handling safely (e.g. ruptures or explosions).

The conditions of temperature for treatment can be held constant or can be varied. Temperatures useable can range from sub-room temperatures (e.g. from about −10° C. to about 20° C.) to room temperature to about the decomposition temperature of silane (e.g. about 500° C.), preferably at a temperature without significant silane decomposition. Preferred temperatures can range from about 150° C. to about 300° C., more preferably from about 180° C. to about 250° C.

The length of time for treatment can vary, depending in part upon the treatment conditions of pressure and temperature, the type of silane used for treatment, and the degree of efficiency desired for the prevention of formation of ethylsilane: generally the longer the length of time for treatment, the lesser ethylsilane formation can be obtained down to a practical minimum, other factors (e.g. pressure, temperature, silane) being held constant and the values thereof as stated herein.

For example, in accordance with the invention, pretreatment of a molecular sieve comprising type 4-A sodium zeolite and having a structure suitable for the separation of ethylene and silane in gaseous mixture can be performed by subjecting the molecular sieve to gaseous silane at a temperature of about 180° C. for about three hours.

In another embodiment of the invention is the molecular sieve comprising sodium zeolite means for separating ethylene from silane in admixture, which sieve has been exposed to an effective amount of silane for an effective length of time to prevent the formation of a significant amount of ethylsilane during the separating of the ethylene and the silane. The exposure of silane to the sodium zeolite means can be produced by the treatment methods disclosed herein. The exposure can also be produced by the use of the molecular sieve to separate ethylene and silane in admixture. Spent or used molecular sieve can be recycled or regenerated for the use of separating ethylene and silane in admixture with the unexpected result that when such sieves have been exposed to an effective amount of silane for an effective length of time, the formation of ethylsilane is reduced or eliminated. The exposure to silane can occur during a process to separate ethylene and silane in admixture. The effective amount of silane and effective length of time can be the result of a one purification operation or the result of two or more purification operations performed over varying periods of time. Preferably, the molecular sieve's sodium zeolite means used in such separation (e.g. purification) comprise sodium aluminum silicate zeolite type 4-A.

When the molecular sieve is treated with silane at a temperature, pressure and time in accordance with the present invention, the formation of a significant amount of ethylsilane during use of the molecular sieve to separate ethylene and silane can be effectively prevented. Preferably about 1 to about 5 weight percent ethyl silane relative to the weight of silane is formed, more preferably about 0.1 to 5 weight percent, most preferably less than about 0.1 weight percent.

In another embodiment the present invention is a process for removing ethylene from a silane composition comprising the step of selectively absorbing the ethylene with a molecular sieve, which sieve has been exposed to an effective amount of silane at a temperature and pressure and for a time effective to prevent the formation of a significant amount of ethylsilane during the absorption step. During this time, temperature and/or pressure can be varied. This prior exposure can be by one of the embodiments illustrated herein before or after, whether as an initial treatment or a regeneration.

In another embodiment, the invention is a process for regenerating a spent molecular sieve comprising sodium zeolite means useful for the separation of ethylene and silane in admixture. This embodiment comprises the steps of (1) flowing an inert gas through the spent molecular sieve to purge the sieve of residual gases, and (2) subsequently exposing gaseous silane to the spent molecular sieve.

The inert gas used in step (1) is preferably helium.

The pressures used in this step (1) can conveniently be atmospheric or ambient pressures. Preferred pressures are lower than atmospheric (e.g. vacuum), the lower the better, e.g. about 0.1 mm Hg to about 0.01 mm Hg. The pressure can be varied during the process, preferably with the lowest pressure existing at or near the conclusion of step (1).

The temperature during step (1) conveniently can be room or ambient temperature, but can range from ambient or room temperature to an elevated temperature (e.g. from about 25° C. to about 500° C.). Preferred temperatures are those most conducive to purging gases from the molecular sieve (e.g. the elevated temperatures) without attending damage to the sieve.

Step (2) exposing of gaseous silane to the molecular sieve can be performed by introduction of silane to the molecular sieve to create a stationary bed of gaseous silane or by allowing the gaseous silane to flow through the molecular sieve.

The pressure used in step (2) can conveniently be about atmospheric pressure. Preferably, a range of pressure from ambient to elevated pressures can be used (e.g. one to ten atmospheres) taking care not to cause structural damage to the sieve. Pressure can be varied during step (2).

The temperatures during step (2) can be room or ambient temperature or elevated. Preferred temperatures are from about 150° C. to about 300° C., more preferably from about 180° C. to about 250° C. Temperatures can be varied during step (2).

The length of time for step (2) can be varied, depending in part upon pressures and temperatures used and in part upon the desired efficiency of reducing or eliminating the formation of ethylsilane.

An optional step (3) is evacuating the silane gas before use of the molecular sieve for the separation of ethylene and silane in admixture. Preferably, the greater the evacuation of silane the better. Evacuation can be performed by creating from at least a partial vacuum to about a complete vacuum (e.g. about 0.1 mm Hg to about 0.01 mm Hg) or by displacement of gaseous silane by an inert gas, e.g. helium.

The following experiments are provided to illustrate some of the features of the present invention. The experiments are not to be taken as limiting the scope of the invention.

EXPERIMENT 1

A U-tube reactor was constructed using ½-inch by 24-inch stainless steel (SS-316) tubing connected at each end in separate series to a valve, a 50 milliliter stainless steel (SS-316) cylinder and another valve. The entire assembly was passivated with 5% $HNO_3$, dried and leak tested.

Approximately 31 grams of a sodium aluminum silicate zeolite type 4-A molecular sieve (Linde 4-A, Linde Division, Union Carbide Corporation) were added to the U-tube and dried overnight under helium at 160°-165° C.

The U-tube reactor was then treated to vacuum at about 160°-180° C. for about one hour until indication by a mercury manometer of essentially zero pressure (e.g. about 0.1 mm Hg or less). The U-tube reactor was then cooled to room temperature.

Gaseous ethylene was then feed into the U-tube reactor to about 60 psig, feeding continuing until cessation of pressure drop as indicating saturation of the molecular sieve by absorption of ethylene. Evacuation of the system was then performed giving partial vacuum in the reactor followed by closing of the valve.

One cylinder was filled with silane to 90 psig and the other cylinder was filled with ethylene to 90 psig. Both valves between the cylinders and the U-tube reactor were opened and the two gases were sucked into the U-tube and mixed.

The mixture was monitored by an on-line gas chromatography apparatus after one day. Analysis showed a 2.1 area % of ethylsilane relative to the silane peak and ethylene peak. Confirmation by gas chromatography/mass spectrum was made of the presence of ethylsilane ($CH_3CH_2SiH_3$) and ethane (ethylene: ethane ratio of 91:9). Both silane and ethylene samples were greater than 99.3% pure and showed no peak around the ethylsilane retention time on the gas chromatography.

EXPERIMENT 2

The reactor in Experiment 1 was permitted to operate at room temperature for one month. The U-tube was then evacuated under vacuum conditions as before.

Regeneration of the U-tube and molecular sieve was performed with overnight helium treatment as in Experiment 1. Evacuation followed by ethylene saturation with subsequent evacuation and mixing of ethylene and silane was performed as before. After one day, analysis showed the presence of 0.27% ethyl silane relative to silane.

EXPERIMENT 3

A fresh batch of molecular sieves (30 grams) was packed in the U-tube reactor and heated overnight at 180° C. under helium flow. Evacuation was performed at 180° C. for one hour and the reactor was cooled to room temperature. Ethylene was introduced to make about 60 psig for about one hour. Evacuation and addition of approximately equal amounts of ethylene and silane was performed. After one day, analysis showed the presence of 8.4% ethylsilane relative to silane.

EXPERIMENT 4

After one day of use, the U-tube reactor and molecular sieve from Experiment 3 was subjected to regeneration as performed in Experiment 2. Evacuation, saturation with ethylene, evacuation and addition of ethylene and silane were similarly performed. After one day, analysis showed the presence of 4.6% ethylsilane relative to silane.

EXPERIMENT 5

Fresh molecular sieve (28 gms) was packed into the U-tube reactor and evacuated at 180° C. for 2 hours. The sieves were then treated overnight with helium flow at 180° C. After another evacuation, silane at about one atmosphere of pressure was added to the sieve and maintained at 180° C. for 3 hours. Evacuation at 180° C. for one hour then followed. The U-tube was allowed to cool to room temperature.

The sieve was then saturated with ethylene at about 60 psig for one-half hour. The U-tube was evacuated to attain a partial vacuum and the valves were closed. A 75 milliliter cylinder was charged with ethylene to 90 psig. A second 75 milliliter cylinder was evacuated and was charged with silane to 60 psig. The valves between the U-tube and the cylinders were opened, permitting mixing of ethylene and silane with an initial pressure of about 45 psig. After standing overnight at room temperature, analysis showed the presence of 0.52% ethyl silane relative to silane.

The following table 1 is a compilation of Experiments 1-5:

TABLE 1

Formation of Ethyl Silane ($EtSiH_3$) from Silane ($SiH_4$) and Ethylene ($C_2H_4$) on Molecular Sieves

| | Reaction Conditions | | | |
|---|---|---|---|---|
| Experiment No. | Sieve status | Saturation of sieve with $C_2H_4$ | Time days | $EtSiH_3$ % of $SiH_4$ |
| 1 | fresh | saturated | 1 | 2.1[a] |
| 2 | regeneration after >1 month use | saturated | 1 | 0.27 |
| 3 | fresh, helium treated | saturated | 1 | 8.4 |
| 4 | regeneration after 1 day use | saturated | 1 | 4.6 |
| 5 | fresh, treated with $SiH_4$ at 180° C. | saturated | 1 | 0.52 |

[a]Based on total area for silane and ethylene as one peak in GC analysis.

I claim:

1. A process for treating a molecular sieve comprising a sodium zeolite means for separating ethylene and silane in admixture, said process comprising treating said molecular sieve with silane for an effective time and at an effective temperature of from about 150° C. to about 300° C. and an effective pressure to prevent the formation of ethylsilane at a concentration greater than from about 0.1 weight percent to about 5.0 weight percent when separating said ethylene and said silane.

2. The process of claim 1, wherein said sodium zeolite means comprises sodium aluminum silicate type 4-A zeolite.

3. The process of claim 1 wherein the silane used to treat said molecular sieve is at least about 99% pure.

4. Process for pretreating a molecular sieve, said molecular sieve comprising type 4-A sodium zeolite and having a structure suitable for the separation of ethylene and silane in gaseous admixture, said process comprising subjecting said molecular sieve to gaseous silane at a temperature of about 180° C. for about three hours.

* * * * *